United States Patent [19]
Jove et al.

[11] Patent Number: 5,523,898
[45] Date of Patent: Jun. 4, 1996

[54] PARTIAL MR SENSOR BIAS CURRENT DURING WRITE

[75] Inventors: Stephen A. Jove, Watsonville; Albert J. Wallash, Morgan Hill, both of Calif.

[73] Assignee: International Business Machines Corporation, Armonk, N.Y.

[21] Appl. No.: 336,611

[22] Filed: Nov. 8, 1994

[51] Int. Cl.[6] ............................ G11B 5/03; G11B 5/09; G11B 5/127
[52] U.S. Cl. .................. 360/66; 360/46; 360/113
[58] Field of Search ................. 360/66, 61, 113, 360/46

[56] References Cited

U.S. PATENT DOCUMENTS

| | | | |
|---|---|---|---|
| 4,881,143 | 11/1989 | Bhattacharyya et al. | 360/113 |
| 4,948,988 | 8/1990 | Kleiss et al. | 307/296.3 |
| 5,206,590 | 4/1993 | Dieny et al. | 324/252 |
| 5,270,882 | 12/1993 | Jove et al. | 360/67 |
| 5,301,080 | 4/1994 | Ottesen et al. | 360/66 |
| 5,315,468 | 5/1994 | Lin et al. | 360/113 |
| 5,345,343 | 9/1994 | Miura et al. | 360/60 |
| 5,412,518 | 5/1995 | Christner et al. | 360/66 |

FOREIGN PATENT DOCUMENTS 3-250403  11/1991  Japan .

OTHER PUBLICATIONS

JP Reference No. 3–250403, English Abstract, Feb. 7, 1992.

Primary Examiner—W. Chris Kim
Attorney, Agent, or Firm—Leslie G. Murray

[57] ABSTRACT

In a magnetoresistive read/inductive write magnetic transducer, magnetic stability of the magnetoresistive read sensor is improved by reducing the bias current to the magnetoresistive read sensor to a predetermined value during a period when a write current signal is applied to the inductive write head. The reduced bias current is greater than zero, but less than that required for reading data stored in a magnetic storage media. The reduced bias current is about 30% of the full bias current applied during the read operation of the magnetoresistive head.

11 Claims, 3 Drawing Sheets

5,523,898

PARTIAL MR SENSOR BIAS CURRENT DURING WRITE

BACKGROUND

Providing stability to a magnetoresistive (MR) read head is highly desirable.

This invention relates to a MR head having a read sensor and an inductive write transducer. More particularly, the invention is directed to improving the magnetic stability by regulating the bias, particularly the bias current, through the MR head.

Existing magnetic storage systems using MR heads to read data from magnetic media and to write data onto magnetic media suffer instability in relation to the MR head. This instability is caused when the bias current to the MR head is switched off during the period when a write current signal is applied to the inductive write transducer. The instability can cause the loss of data on the magnetic media. This can be destructive, costly and very burdensome.

One manner of avoiding instability is to maintain the bias current to the read sensor at its operational level for reading even though the MR head is in the mode for writing under a current signal being applied to the inductive write transducer. A disadvantage of this system is that it is costly on power, even when this bias current is in the range of several milliamps. This is particularly onerous in computers which are battery operated, such as laptop and notebook computers where such wasted current can be an overall unacceptable cost to the battery life of a computer.

There is a need to provide an improved method of regulating the stability of a MR head while at the same time not rendering the stability process costly in the sense of power usage.

SUMMARY

By this invention there is provided a means and method for regulating the bias current to a MR head in a manner directed to substantially creating stability of the head while not being unduly inefficient in power usage.

According to the invention there is provided in a magnetic storage system of the type using a magnetoresistive read sensor and an inductive transducer, a method for improving magnetic stability of the magnetoresistive read sensor. The method includes the step of reducing the magnetoresistive read sensor bias from a value representative of the normal read value to a predetermined value greater than zero during a period when the write current signal is applied to the inductive write transducer.

Further according to the invention, the bias is preferably a bias current level which is reduced to a partial bias value, which level is preferably about 30% of the level applicable during the read mode when the MR read sensor is operative.

In a preferred form of the invention, the bias current is effectively reduced during substantially all periods when the MR head is in the inductive write mode of operation.

The invention is directed to the method of creating stability in the MR head and to a circuit for providing such stability. The invention is further directed to a magnetic storage system incorporating a magnetoresistive head for reading and sensing data recorded on magnetic media and incorporating the method and circuit for regulating bias current to the MR head.

The invention is further described with reference to the following drawings.

DRAWINGS

DESCRIPTION

Magnetic Storage System

Figure 1:
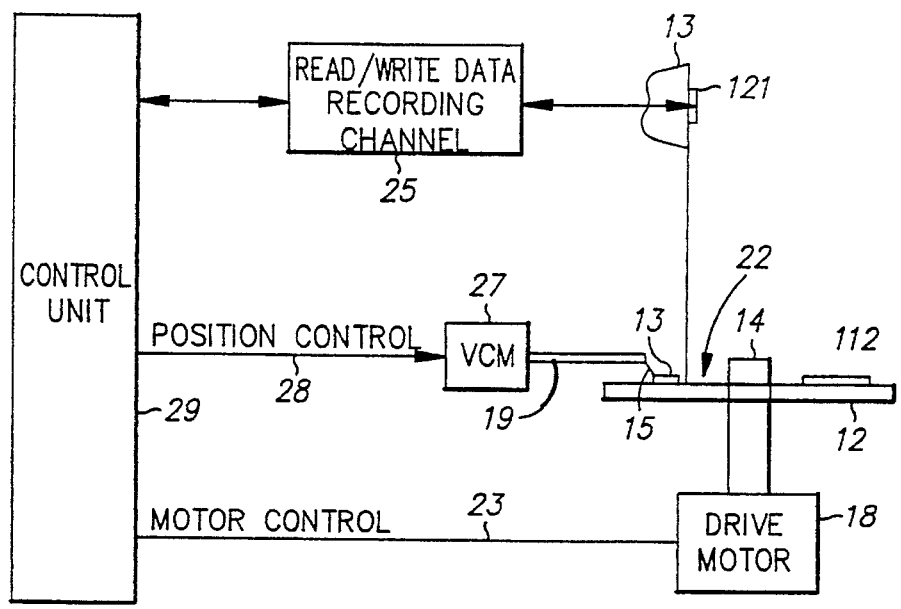
FIG. 1 is a simplified block diagram of a magnetic disk storage system embodying the present invention.

Although the present invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media 112 on each disk is in the form of an annular pattern of concentric data tracks on disk 12.

At least one slider 13 is positioned on the disk 12, each slider 13 supporting one or more magnetic read/write heads 121. As the disks rotate, the sliders 13 are moved radially in and out so that the heads 121 may access different portions of the disk surface 22 containing the data. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means shown in FIG. 1 is a voice coil motor (VCM). The VCM is a coil moveable within a fixed magnetic field, and the direction and velocity of the coil movements is controlled by the current supplied.

During operation of the disk storage system, the rotation of the disk 12 generates an air bearing between the slider 13 and the disk surface 22. The air bearing thus counterbalances the slight spring force of the suspension 15 and supports the slider 13 off the disk surface by a small, substantially constant spacing during operation.

The various components of the disk storage system are controlled in operation by signals generated by control unit 29, such as access control signals and internal clock signals, and which includes logic control circuits, storage means and a microprocessor. The control unit 29 generates control signals to control various system operations such as motor control signals on line 23 and head position control signals on line 28. The control signals on line 28 provide the desired current profiles to optimally move and position a selected slider 13 to the desired data track on the associated disk 12. Read and write signals are communicated to and from read/write heads 121 by means of a read/write data recording channel 25.

The above description of a typical magnetic disk storage system, and the accompanying illustration of it in FIG. 1 are for representation purposes only. It should be apparent that disk storage systems may contain a large number of disks and actuators, and each actuator may support a number of sliders.

MR Head

Figure 2:
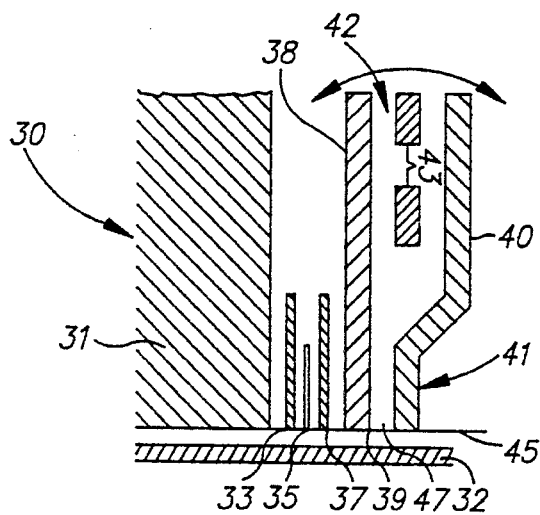
FIG. 2 is a sectional side view of a first MR head read sensor and inductive write transducer within the scope of the present invention.
Figure 3:
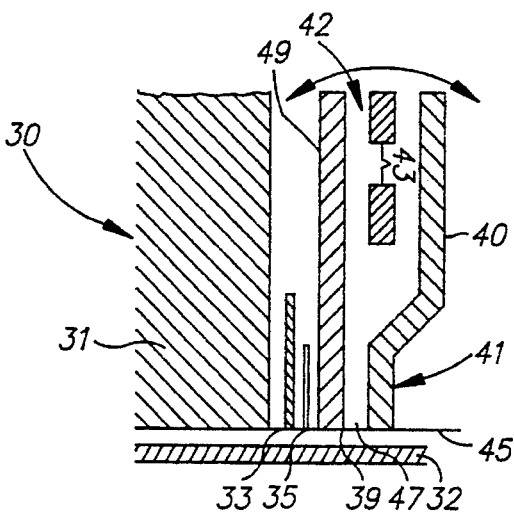
FIG. 3 is a sectional side view of a second MR had read sensor and inductive write transducer within the scope of the invention.

FIGS. 2 and 3 show a portion of a MR read/inductive write magnetic head 30 in transducing relationship with a rotating magnetic recording disk 32 such that the head air bearing surface 45 (ABS) is disposed in facing relationship with and slightly above the disk recording surface. Generally, such a head 30 includes an MR read assembly and an inductive write assembly formed adjacent one another on a substrate surface. The substrate surface is typically the vertical surface forming the trailing end of the slider 13 (as shown in FIG. 1) carrying the magnetic head.

The MR read assembly comprises a MR sensing element 35 fabricated of a ferromagnetic material, such as a nickel-iron (NiFe) alloy, for example, which is enclosed by first and second magnetic shield elements 33 and 37, respectively. The MR sensing element can comprise a single layer of NiFe, commonly referred to as Permalloy. More typically, the MR sensing element will comprise a multilayer magnetic structure, including magnetic bias layers, of the type described in U.S. Pat. No. 5,315,468 utilizing the anisotropic MR effect or in U.S. Pat. No. 5,206,590, utilizing the giant MR effect. The shield elements 33 and 37 are generally made of a highly permeable magnetic material, such as Permalloy or Sendust, a trialloy of aluminum-silicon-iron. The magnetic shield elements 33 and 37 minimize or eliminate magnetic interferences from affecting the MR element 35 and thereby producing extraneous electrical pulses. Conductive leads generally copper (Cu) or other suitable conductive material, attached electrically at the end portions of the MR element 35 couple the MR element to external circuitry to provide a means for sensing the resistance of the MR element.

The MR read assembly is formed by vacuum deposition techniques, such as sputter deposition, for example, on the substrate 31. The various elements of the MR assembly are surrounded and insulated from each other by layers 42 of insulating material, such as silicon dioxide or aluminum oxide, for example.

The inductive write assembly comprises a lower or first pole piece 38 and an upper or second pole piece 40. The first and second pole pieces 38, 40 are made of a highly permeable magnetic material such as NiFe, for example. The pole pieces 38,40 form a magnetic circuit magnetically connected together at a back gap portion (not shown) with the first and second pole tips 39 and 41 forming a magnetic gap 47 at the air bearing surface 45. One or more layers of electrical conductors 43, generally made of Cu, for example, form the inductive coil disposed between the first and second pole pieces 38, 40. The inductive coil 43 is also connected to external circuitry via conductive leads. The pole pieces 38, 40 and the inductive coil conductors 42 are fabricated by well-known processes such as electro-plating or sputter deposition, for example. The pole pieces are insulated electrically from the inductive coil and the MR head assembly by layers 42 of insulating material. Additionally, the entire assembly is covered with a capping layer 42 of insulating and protective material.

The head 30 shown in FIG. 2 is sometimes referred to as a "piggyback" MR head, namely a PMR head. An alternate configuration referred to as a "merged" head wherein the second MR magnetic shield element 37 is merged with the inductive assembly first pole piece 38 to form a single element 49 which performs both functions is shown in FIG. 3.

Typically, a bias source circuit 70 for the sensing operation and the write assembly for the write mode are incorporated in the read/write data recording channel circuitry 25, as shown in FIG. 1.

The sensing element 35 requires an electric current to be active. The current serves as a sensing current for converting the resistance variations produced by the field emanating from a magnetic media 112 into voltage or current variations according to the manner in which a preamplifier detects signals across the sensing element 35. The higher the current applied to the sensing element 35, the larger the readout voltage from the sensing element 35. Depending on whether the sensed is characteristic current or voltage, there will be changes in the appropriate sensed signal current or signal voltage that will be proportional to the bias current applied.

Bias Current System

Figure 4:
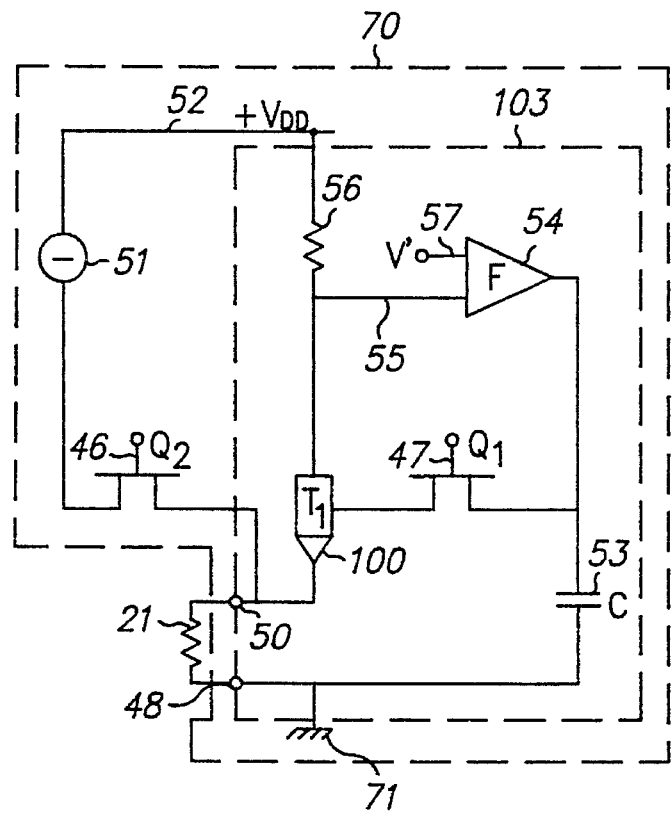
FIG. 4 is a diagram of a circuit for developing a partial MR bias during the period when a write current signal is applied to the inductive write transducer. The circuit illustrates a portion of a module of an arm electronics system applicable for controlling the reading and writing of data with a MR head.

FIG. 4 illustrates a portion of an electronic circuit for operation in a magnetic storage system using the magnetoresistive read head having MR sensing element 35, as shown in FIGS. 2 and 3, represented as resistor 21, and the bias source circuit 70. The complete MR head of the invention includes two elements, the MR sensing element 35 and the write means similar to that shown in FIGS. 2 and 3. The illustrated bias source circuit 70 is representative of operating with a single sensing element 21. There are in fact a multiplicity of sensing elements 21, for instance two or more, in a typical magnetic disk storage system.

The bias source circuit 70 acts to improve the magnetic stability of the magnetoresistive read sensor 21. This stability is achieved by reducing the MR bias current applied through the bias source circuit 70 from a full bias current to a predetermined value greater than zero during the period when the write current signal is being applied to the inductive write transducer in the head. A full or 100% bias current is applied to the MR sense element 21 during the read mode, namely the sense mode, of the head.

An MR sensor 21 is connected with the circuit of the bias source circuit 70 at terminals 48 and 50. The bias source circuit 70 also includes an amplifier circuit which amplifies the signal current from the MR sensor 21 during the sense mode. The bias source circuit 70 applies a bias current to the MR sensor 21 during the read mode and also during the write mode in the manner described below.

The MR sensor 21 is connected to an amplifier, transistor 100, in common base fashion. The output signal from the MR sensor 21 appears across the resistor 56 which is connected to the collector of transistor 100.

In order to bias the MR sensor 21 with a bias current for the read mode of the head, there is a feedback loop. A reference voltage v' is applied along line 57 to a feedback amplifier 54. The output of amplifier 54 connects through transistor 47 to the base of transistor 100. A capacitor 53 is connected to ground 71, which serves to stabilize the loop. The circuit amplifies a signal from the MR sensor 21 and cuts off all the signals below a prescribed frequency. As such, a DC component that is generated across the sensor 21 due to the bias current appears across the resistor 56, but does not appear between the negative terminal 55 of the resistor 56 and the input line 57. In this manner a differential output signal is obtained between these inputs to the feedback amplifier 54. The output signal from the MR sensor 21 in the read mode appears across the resistor 56.

Transistor 47 is a field effect transistor (FET) which acts as a switch to engage transistor 1 00 and thereby connect the illustrated MR sensor 21 as shown. In a system having multiple MR sensors, if the illustrated MR sensor was not currently selected, the transistor 100 would not be engaged. There would be another switching transistor 47 that would engage another transistor 1 00 which would engage a different selected MR sensor 21 of the magnetic storage system.

FET 46 is used only when the MR sensor 21 that is shown in FIG. 4 is operational in the write mode. Each MR sensor 21 in a multiple head system has its own related FET 46. The current source 51 is common for all MR sensors 21.

Assume that the write mode is operational, and that previously the read mode was operational. Transistor 47 would be engaged in the previously operational read mode so as to provide a bias current as described in the read mode. Transistor 1 00 and FET 47 are disengaged during the write mode. In the absence of FET 46, there would be no bias current flowing through the MR sensor 21 during the write mode and the current source 51 would be disengaged.

Engaging FET 46 and the current source 51 allows current to flow through the MR sensor 21 without having to engage the amplifier 100. Less power is dissipated by the current going directly through the MR sensor 21 via current source 51 and FET 46, namely excluding the transistor amplifier 100. In this configuration the same current through the MR sensor 21 can be applied via current source 51 and FET 46 during a write mode which was previously applied to the sensor 21 during the read mode via transistor 100 and the feedback loop described. Alternatively, one could apply a lesser current through the MR sensor 21, by adapting current source 51 appropriately. Preferably, the bias current applied to the MR sensor 21 during the write mode is in the range of zero to 30 percent of the bias current applied during the read mode.

In an alternative circuit, without FET 46 and the current source 51, there would be a need to adjust the current in the amplifier 100 to apply a bias current during the write mode. The amplifier 100 would need to adjust more or less instantaneously. Since that is not practical because the feedback loop is relatively slow, the capacitor 53 would need to be relatively small to get an effective fast response.

The circuit of FIG. 4 has the ability to either apply the full bias current to the MR sensor 21 during the read mode or the write mode, or a full or partial bias current during the write mode. With FET 47 operating in the read mode of the circuit in FIG. 4, the full bias current goes through transistor 100 to the MR sensor 21. When the FET 47 is disengaged, and the FET 46 is engaged, whatever current that is generated by the current source 51 is applied to the MR sensor 21 in the non-read mode. The current source 51 can generate a partial bias current through the MR sensor 21, namely at less than the full bias current applicable during the read mode.

This partial bias current prevents instability in the MR sensor 21 by maintaining at least a minimal current through the MR sensor 21 during the write mode. As such, when there is an exit from the write mode back into the sense mode, namely the read mode, the MR sensor 21 can read quickly again.

An appropriate control signal is applied from the control unit 29 (FIG. 1) to FET 46 and FET 47 when the different bias currents are to be applied to the MR sensor 21 during the write mode or the read mode from magnetic media 112.

When signals are received representative of having the MR sensor 21 in the read mode, a normal full bias current is applied by the bias current source 70 to the MR sensor 21. When the write operation mode is active, namely when a write current signal is to be applied to the write transducer of head, the bias source circuit 70 operates so that about 30% of the normal bias current is applied to the MR sensor 21. The 30% is determined by the various magnitudes of the components of the circuit of FIG. 4.

Figure 8:
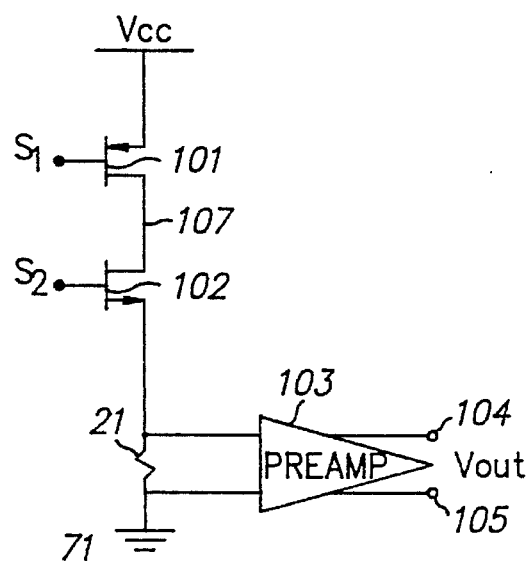
FIG. 8 is a circuit diagram of an alternative means for applying a bias current to the MR head during the read and write modes of the MR head.

An alternative biasing current circuit is illustrated in FIG. 8.

A PFET 101 is connected in series with an NFET 102 which is connected in series with a MR sensor 21 across which a signal from a MR sensor 21 would appear. The MR sensor 21 is connected at its opposite end to ground 71. The output from the MR sensor 21 is connected to a preamplifier 103 which provides an output signal at terminals 104 and 105 representative of the output voltage sensed by the MR sensor 21. The preamplifier 103 is a similar circuit to a portion of the circuit of FIG. 4. The preamplifier 103 is illustrated in FIG. 4.

In FIG. 8, for each MR sensor 21 in a multihead magnetic storage system there is a dedicated NFET 102. The PFET 101 is common to all MR sensors 21. The preamplifier 103 is off in all modes except the read mode, namely the sense mode of the MR sensors 21.

In the write mode for any magnetic head of the magnetic storage system the NFET 102 for the MR sensor 21 is engaged, such that a bias current can be applied by the circuit constituted by the series connected PFET 101 and NFET 102.

In FIG. 8, the terminal $S_1$ to the PFET 101 would act as a switch connector and the terminal $S_2$ is a head select terminal operating the NFET 102.

Terminal 107 is a common node for connecting with the biasing current circuit constituted by the respective PFET 101 and NFET 102. For each selected MR sensor 21, the logic arrangement of the respective enhancement devices, PFET 101 and NFET 102, is as follows:

|  | Read | Write |
| --- | --- | --- |
| $S_1$ | H | L |
| $S_2$ | L | H |

In this manner when the switch terminals $S_1$ is high and $S_2$ is low for particular MR sensor 21, the MR sensor 21 is in read mode. When the switch terminal $S_1$ is low and switch terminal $S_2$ is high for a particular MR sensor 21 then the head is in the write mode. The circuit constituted by the two transistors 101 and 102 is in a non-linear mode, and constitutes a series connected resistance proportional to the channel dimensions of the FET device(s) which provides a bias current circuit, basically as a poor current source.

Examples

Figure 5:
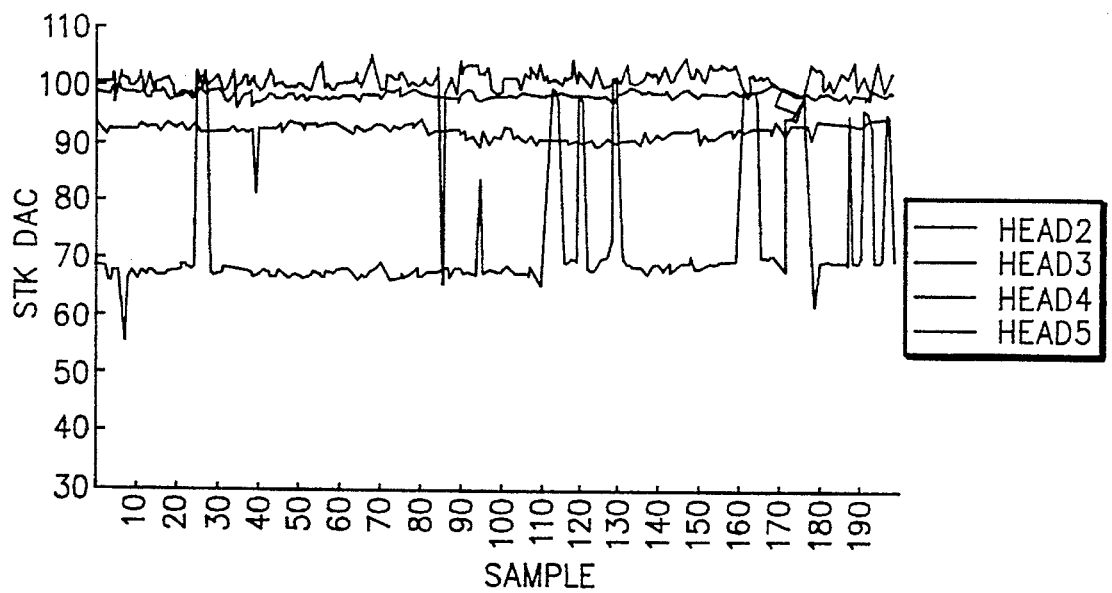
FIG. 5 is a graphical plot of a file level stability test illustrating amplitude instability. The relative amplitude of the head for each of four heads in a file is plotted against different samples.

As illustrated in FIG. 5, there is shown the effect of amplitude instability in a system having four heads, namely, piggyback MR heads 30 as illustrated in FIG. 2. In this test, before each amplitude sample, the full bias current applicable to the sense mode is shut off in accordance with prior art practices. The PMR head 30 is switched into the write mode to write on a data track of media 112. This example is similar to the actual write process used in normal file operation when the PMR can switch regularly between write and sense modes.

As can be seen in FIG. 5, three of the four heads show intermittent amplitude variations. In fact, one head is "stuck" in a low amplitude state and sometimes jumps up to a high amplitude. Testing of a large number of heads has shown that the average amplitude loss is about 30% and can be as high as 80% relative to normal. This amplitude instability reduces file yields and results in significant data loss. The manner of overcoming this problem in the prior art has been to keep the MR bias current from source 70 fully on during the write mode. This, however, is expensive in power dissipation.

Figure 6:
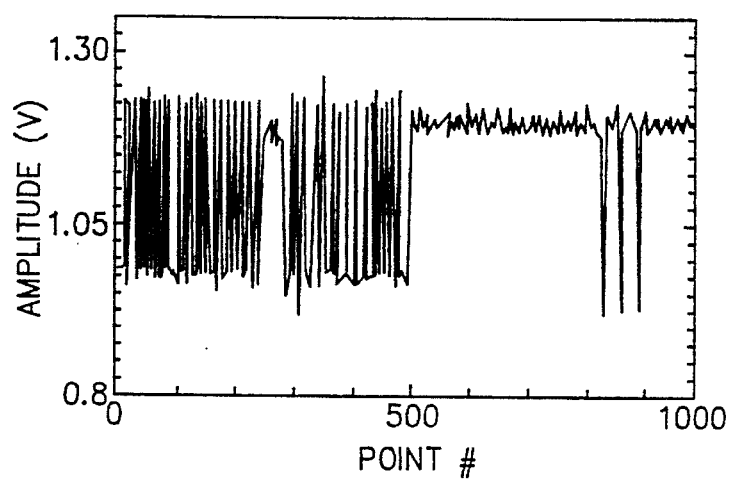
FIG. 6 is a graphical plot of a relative amplitude stability test showing output signal amplitude measured in volts for a head versus the point number for a MR head tested on a spinstand, with the MR bias current off during write, namely a prior art configuration.

FIG. 6 shows the amplitude versus point number for a MR head tested on a spinstand. Between each point, the MR bias current is shut off and the write head is turned on in accordance with the prior art. There is a bimodal amplitude behavior with a 27% loss in the amplitude relative to normal.

Figure 7:
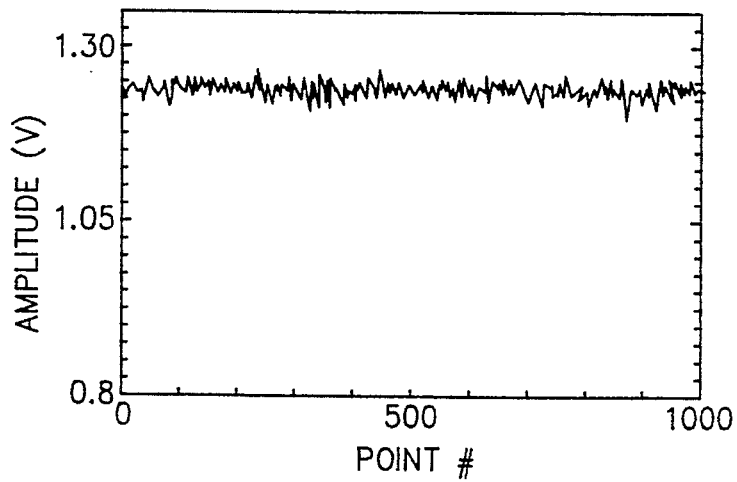
FIG. 7 is a representation of the amplitude for the same head as illustrated in FIG. 6, with the bias current to the MR head partially on during write, namely in terms of the invented configuration.

According to the present invention, by maintaining the MR sensor bias current at a partial percentage of the full level during the write operation, the instability of the MR head is overcome. Comparatively, FIG. 7 shows the amplitude stability tests for the same head as FIG. 6, but in terms of the invention. The head is stable. The difference between the two tests was that a bias current of 7.5 milliamps was applied to the MR head during writing. This was about 100% of full bias current applicable to the sense mode.

This same head was tested 10 times with MR bias current off during writing as illustrated in FIG. 6, and was always unstable. Contrarily, it was tested for 100,000 cycles in terms of FIG. 7 with the MR bias current partially on during writing, and was stable.

Further experimentation was effected with the head of FIGS. 6 and 7 with a bias current of about 2 milliamps. This is about 30% of the full bias current during the read cycle. The same degree of stability was achieved as illustrated in FIG. 7 under these situations. Stability during write was achieved for 10 mW of power dissipation rather than the 42 mW power dissipation at full bias current.

Applying partial MR bias current during writing helps stabilize the MR sensor and prevent domain formation induced by the write head magnetic field excitation. This results in higher yields at the file level and permits operation of the file at higher temperatures without inducing amplitude instability in the MR heads.

Magnetic instability of the MR head due to temperature effects increases as operating temperature increases. With a 2 milliamp bias current applied to the MR head during the write operation, the instability at the higher temperatures is minimized or avoided. As a result, the increased MR read sensor stability and sensitivity provide a better signal-to-noise ratio (SNR).

Many other examples of the invention exist, each differing from the others in matters of detail only. For instance, instead of a 30% of full bias current, a different value of bias current may be used. Also it may be necessary to apply the reduced current for only selected periods of the write operation, rather than during each period of the write cycle.

Although the invention has been described in terms of a bias current, the system would work equally well with a bias voltage.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

What is claimed is:

1. In a magnetic disk storage system of the type using a magnetic head having a magnetoresistive read sensor and an inductive write transducer, a method for improving the magnetic stability of the magnetoresistive read sensor comprising the step of reducing a bias current provided to the magnetoresistive read sensor from a full bias current value applied during a sense mode of the magnetic head to a predetermined value greater than zero during the period when the magnetoresistive read sensor is non-operative for sensing and a write current signal is being applied to the inductive write transducer.

2. A method as claimed in claim 1 wherein the bias current is of a value in the range of greater than zero to about 30 percent of the value applied during the sense mode.

3. A method as claimed in claim 2 wherein the reduction of the bias current from the level during the sense mode is to about 30% of the level during the sense mode.

4. A circuit for operation with a magnetic head for relating with magnetic fields in a magnetic disk medium having encoded magnetic information, the magnetic head including:

(a) a magnetoresistive read sensor to read magnetic changes in the medium; and (b) an inductive write transducer to create magnetic changes in the medium; the circuit comprising:

(c) means for supplying a bias current to the magnetoresistive read sensor during a time when the magnetic head is in a sense mode; and (d) means for reducing the bias current below the value of the bias current for the sense mode and to a level greater than zero when the magnetoresistive read sensor is non-operative for sensing.

5. A circuit as claimed in claim 4 including means for applying the reduced value of said bias current when the inductive write transducer is operable when a write current signal is applied to the inductive write transducer.

6. A circuit as claimed in claim 5 including switch means to effect the transition of the bias current between the value during operation of the magnetoresistive read sensor and the reduced value during operation of the inductive write transducer.

7. A circuit as claimed in claim 6 wherein the switch means includes a pair of transistors operable with the magnetoresistive read sensor, and a differential amplifier operable with the transistors whereby the removal of a signal for activating the magnetoresistive read sensor acts through the transistors and the differential amplifier to apply the reduced bias current to the magnetoresistive read sensor.

8. A magnetic head circuit for relating with magnetic fields in a magnetic disk medium having encoded magnetic information, comprising:

(a) a magnetoresistive read sensor to read magnetic changes in the medium;

(b) an inductive write transducer to create magnetic changes in the medium;

(c) means for supplying a bias current to the magnetoresistive read sensor during a time when the magnetic head is in a sense mode; and (d) means for reducing the bias current below the value of the bias current for the sense mode and to a level greater than zero when the magnetoresistive read sensor is non-operative for sensing.

9. A magnetic head circuit as claimed in claim 8 including means for applying the reduced value of said bias current when the inductive write transducer is operable when a write current signal is applied to the inductive write transducer.

10. A magnetic storage system comprising:

a magnetic disk storage medium for recording of data;

a magnetic transducer maintained in a closely spaced position relative to said magnetic storage medium during relative motion between said magnetic transducer and said magnetic storage medium, said magnetic transducer including a magnetoresistive read sensor for reading data by reacting to magnetic changes on the storage medium and including an inductive write transducer for writing data on the magnetic storage medium by effecting discrete magnetic changes on the magnetic storage medium;

means for supplying a bias current to the magnetoresistive read sensor during a time when the magnetic transducer is in a sense mode; and means for reducing the bias current below the value of the bias current applied for the sense mode and to a level greater than zero when the magnetoresistive read sensor is non-operative for sensing.

11. A magnetic storage system as claimed in claim 10 including means for applying the reduced value of said bias current when the inductive write transducer is operable when a write current signal is applied to the inductive write transducer.

* * * * *